(12) United States Patent
Fujita et al.

(10) Patent No.: US 12,112,149 B2
(45) Date of Patent: Oct. 8, 2024

(54) PROGRAM CREATION ASSISTANCE DEVICE

(71) Applicant: Mitsubishi Electric Corporation, Tokyo (JP)

(72) Inventors: Kohei Fujita, Tokyo (JP); Nobutoshi Watanabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 75 days.

(21) Appl. No.: 17/922,374

(22) PCT Filed: Jul. 7, 2020

(86) PCT No.: PCT/JP2020/026549
§ 371 (c)(1),
(2) Date: Oct. 31, 2022

(87) PCT Pub. No.: WO2022/009304
PCT Pub. Date: Jan. 13, 2022

(65) Prior Publication Data
US 2023/0176832 A1   Jun. 8, 2023

(51) Int. Cl.
*G06F 8/34* (2018.01)

(52) U.S. Cl.
CPC ........................... *G06F 8/34* (2013.01)

(58) Field of Classification Search
CPC ........................................................ G06F 8/34
(Continued)

(56) References Cited

U.S. PATENT DOCUMENTS

| 6,243,861 B1 | 6/2001 | Nitta et al. |
| 2014/0359563 A1* | 12/2014 | Xie .......................... G06F 8/34 |
| | | 717/106 |
| 2016/0321037 A1 | 11/2016 | Ono et al. |

FOREIGN PATENT DOCUMENTS

| JP | 9-171405 A | 6/1997 |
| JP | 10-69469 A | 3/1998 |

(Continued)

OTHER PUBLICATIONS

Neves, Jose G., et al., Integration of tools for parallel real-time systems, Proceedings Sixth International Conference on Real-Time Computing Systems and Applications, Dec. 1999, 4 pages, [retrieved on Mar. 8, 2024], Retrieved from the Internet: <URL:http://ieeexplore.ieee.org/>.*

(Continued)

*Primary Examiner* — Geoffrey R St Leger
(74) *Attorney, Agent, or Firm* — XSENSUS LLP

(57) ABSTRACT

A program creation assistance device of the present disclosure includes a program creation section and an execution time estimation section. The execution time estimation section includes a processing time estimation section and a communication time estimation section. The processing time estimation section executes a processing time estimation process which obtains an estimated processing time by estimating a processing time of a corresponding process for each of multiple icons created in the program creation section, based on a specified CPU and OS. The communication time estimation section executes a communication time estimation process which obtains an estimated communication time by estimating a communication time for each of a necessary number of communication paths, based on the specified CPU and OS.

7 Claims, 18 Drawing Sheets

(58) Field of Classification Search
USPC .................................. 717/105, 107, 109, 113
See application file for complete search history.

(56) References Cited

FOREIGN PATENT DOCUMENTS

| | | |
|---|---|---|
| JP | 3489962 B2 | 1/2004 |
| JP | 2016-207166 A | 12/2016 |
| JP | 2018-10389 A | 1/2018 |

OTHER PUBLICATIONS

International Search Report and Written Opinion mailed on Oct. 6, 2020, received for PCT Application PCT/JP2020/026549, filed on Jul. 7, 2020, 9 pages including English Translation.

* cited by examiner

F I G. 4
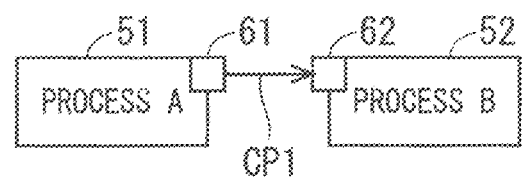

F I G. 7
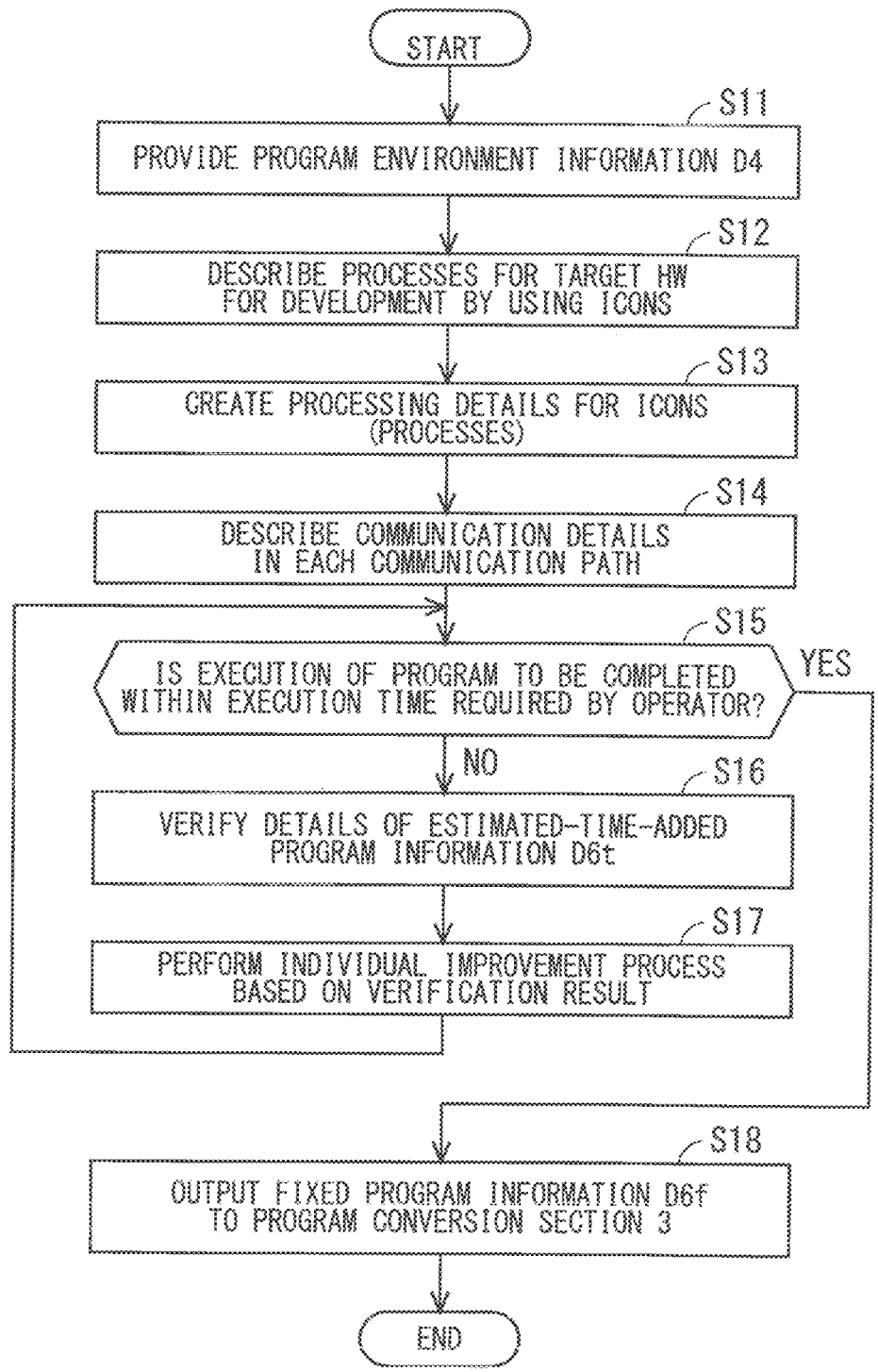

| ESTIMATED PROCESSING TIME [ms] | PROBABILITY |
|---|---|
| ... | ... |
| 4.8 | 0.120985 |
| 4.9 | 0.176033 |
| 5 | 0.199471 |
| 5.1 | 0.176033 |
| 5.2 | 0.120985 |
| ... | ... |

F I G. 1 7
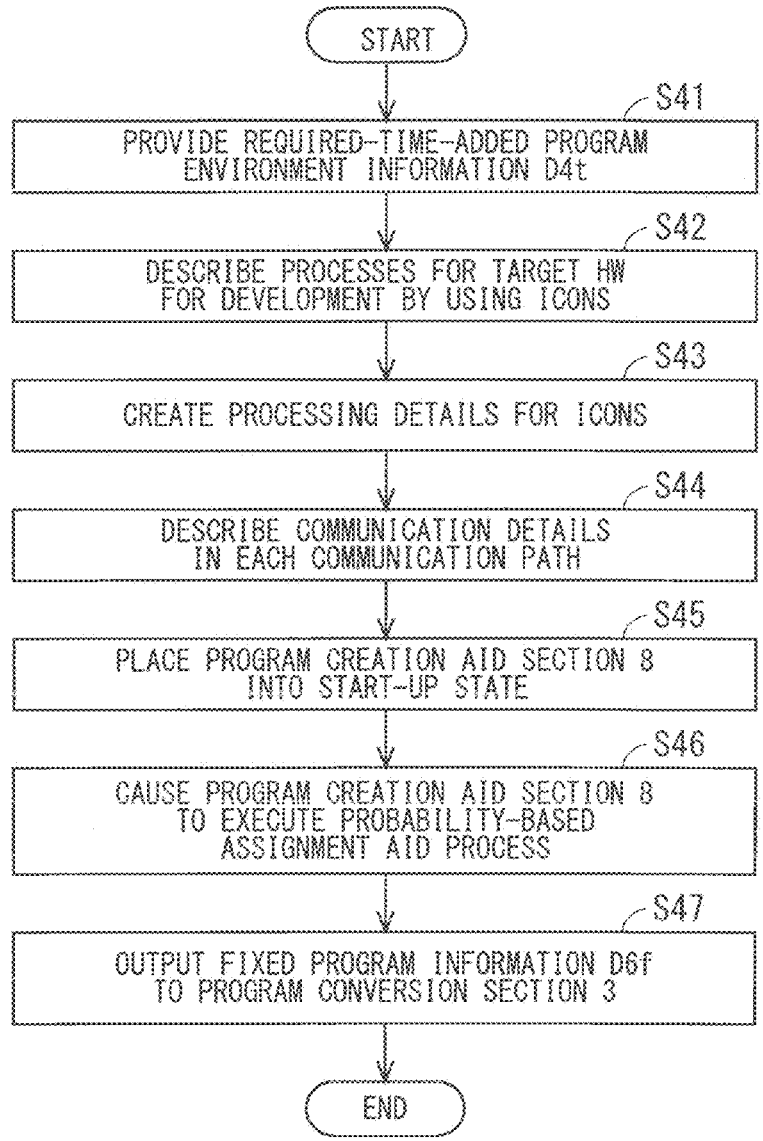

PROGRAM CREATION ASSISTANCE DEVICE

CROSS-REFERENCE TO RELATED APPLICATION

The present application is based on PCT filing PCT/JP2020/026549, filed Jul. 7, 2020, the entire contents of which are incorporated herein by reference.

TECHNICAL FIELD

The present disclosure relates to a program creation assistance device for assisting in the development of programs to be executed in a parallel real-time processing device.

BACKGROUND ART

Conventionally, there is a program development device disclosed, for example, in Patent Document 1 as a program creation assistance device for developing programs to be executed in a parallel real-time processing device.

This program development device includes an input device for selection of icons and the like for creating diagrams, a display device for displaying diagrams that are being created or have been created, a diagram creation section for creating diagrams, and an icon storage section for storing program entities corresponding to the icons used for the creation of diagrams. The program development device further includes a diagram storage section for storing created diagrams, an interpreter for interpreting and executing the created diagrams, and an object library composed of a plurality of objects.

PRIOR ART DOCUMENTS

Patent Document(s)

Patent Document 1: Japanese Patent No. 3489962

SUMMARY

Problem to be Solved by the Invention

Conventional program creation assistance devices typified by the program development device disclosed in Patent Document 1 cannot describe the configuration of HW (hardware) and SW (software) of a system that executes the parallel real-time processing. For execution of processes on a computer including multiple CPUs (Central Processing Units) and OSs (Operating Systems), a design with consideration given to the CPUs and OSs that execute the respective processes is hence separately required, which in turn takes time and effort.

A user cannot easily check the time required to execute the processes under specified CPU and OS environments in the stage of program creation using the program creation assistance device. It is hence relatively difficult for the user to recognize whether a created program will be finished within a period of time desired by the user or not.

Thus, when a conventional program creation assistance device is used, it has been difficult to create programs so as to reliably meet specifications required for the parallel real-time processing device.

It is therefore an object of the present disclosure to solve the aforementioned problems and to provide a program creation assistance device that accurately assists in the creation of a program to be executed within a period of time desired by a user.

Means to Solve the Problem

A program creation assistance device according to the present disclosure is a program creation assistance device for a parallel real-time processing device, comprising: an input device to provide program environment information including a configuration of a CPU and an OS for use by the parallel real-time processing device; a program creation circuitry to create a program using the CPU and OS specified by the program environment information to output program information indicating details of the program; and an execution time estimation circuitry to receive the program information and to execute an execution time estimation process which obtains an estimated program execution time for the program, the program creation circuitry including a processing configuration description circuitry to execute a processing configuration description process which brings multiple processes making up the program into correspondence with multiple icons, specifies a CPU and an OS for each of the multiple icons, and describes an execution order relationship between the multiple icons, and a communication detail description circuitry to execute a communication detail description process which describes communication details of each of a necessary number of communication paths between the multiple icons, the execution time estimation circuitry including a processing time estimation circuitry to execute a processing time estimation process which obtains an estimated processing time by estimating a processing time of a corresponding process for each of the multiple icons, based on the specified CPU and OS, and a communication time estimation circuitry to execute a communication time estimation process which obtains an estimated communication time by estimating a communication time for each of the necessary number of communication paths, based on the specified CPU and OS, wherein the processing configuration description process and the communication detail description process are executed in response to a user operation using the input device, and an instruction for start of execution of the processing time estimation process and the communication time estimation process is provided by a user operation using the input device, and wherein the execution time estimation process includes the processing time estimation process and the communication time estimation process, and the estimated program execution time includes the estimated processing time for each of the multiple icons and the estimated communication time for each of the necessary number of communication paths, the program creation assistance device further comprising a display to display estimated-time-added program information on a screen, the estimated-time-added program information being information in which the estimated processing time is brought into correspondence with each of the multiple icons and in which the estimated communication time is brought into correspondence with each of the necessary number of communication paths.

Effects of the Invention

The program creation assistance device of the present disclosure causes the processing time estimation circuitry and the communication time estimation circuitry to execute the processing time estimation process and the communication time estimation process, thereby obtaining the estimated processing time for each of the multiple icons and the estimated communication time for each of the necessary number of communication paths as the estimated program execution time, based on the specified CPU and OS.

Thus, a user is able to change the correspondence of CPUs and OSs with the multiple icons as appropriate to relatively easily recognize factors adversely affecting the overall execution time of the program by reference to the estimated-time-added program information displayed on the screen of the display.

As a result, the program creation assistance device of the present disclosure effectively assists in the creation of the program to be executed within a period of time desired by the user.

These and other objects, features, aspects and advantages of the present disclosure will become more apparent from the following detailed description and the accompanying drawings.

BRIEF DESCRIPTION OF DRAWINGS

FIG. 4 is an illustration showing an image of a communication path between icons.

FIG. 7 is a flow diagram showing a procedure for a program creation process using the program creation assistance device of the first embodiment.

FIG. 14 is an illustration showing an example of the estimation result of the probability-distribution-added estimated processing time in tabular form.

FIG. 17 is a flow diagram showing a procedure for the program creation process using the program creation assistance device of the third embodiment.

DESCRIPTION OF EMBODIMENT(S)

First Embodiment

Figure 1:
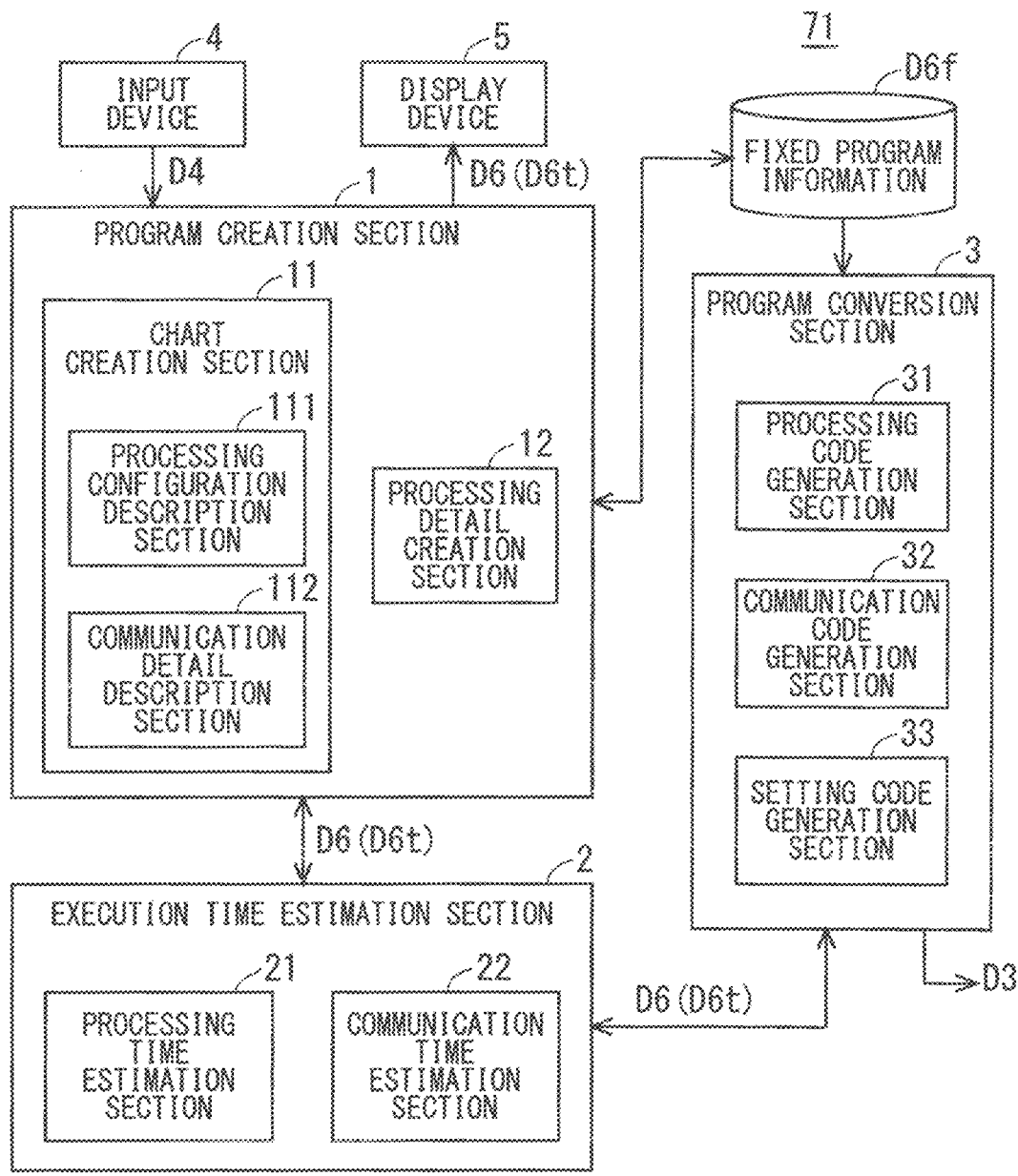
FIG. 1 is a block diagram showing a configuration of a program creation assistance device according to a first embodiment.

FIG. 1 is a block diagram showing a configuration of a program creation assistance device 71 according to a first embodiment of the present disclosure.

As shown in FIG. 1, the program creation assistance device 71 includes a program creation section 1, an execution time estimation section 2, a program conversion section 3, an input device 4, and a display device 5 as its main components.

The input device 4 receives program environment information D4 including configurations of CPUs and OSs used by a parallel real-time processing device from outside, and provides the program environment information D4 to the program creation section 1. The program environment information D4 generally indicates multiple CPUs and multiple OSs. However, the program environment information D4 may indicate either a single CPU and multiple OSs or multiple CPUs and a single OS.

The program creation section 1 creates a program through the use of the CPUs and OSs specified by the program environment information D4. Then, the program creation section 1 outputs program information D6 indicating the details of the created program to the execution time estimation section 2, the program conversion section 3, and the display device 5. A parallel real-time processing device that actually executes the program created by the program creation section 1 is referred to hereinafter as "target HW for development" in some cases.

The execution time estimation section 2 receives the program information D6 to execute an execution time estimation process for obtaining an estimated program execution time for the program.

The program creation section 1 includes a chart creation section 11 and a processing detail creation section 12 as its main components. The chart creation section 11 describes the structure of the program to be created by means of icons and connections between icons. In other words, the chart creation section 11 brings multiple processes that make up the program into correspondence with multiple icons. Further, the chart creation section 11 includes a processing configuration description section 111 and a communication detail description section 112 as its main components.

The processing configuration description section 111 recognizes information about the CPUs and OSs to be used by the target HW for development from the program environment information D4.

The processing configuration description section 111 executes a processing configuration description process which brings multiple processes that make up the program into correspondence with multiple icons, specifies a CPU and an OS for each of the multiple icons, and describes an execution order relationship between the multiple icons. The term "icon" as used herein means a program component corresponding to a "process" hereinafter. Conceivable program components include program modules, functions constituting programs, groups of functions, and the like.

The communication detail description section 112 executes a communication detail description process which describes communication details for each of a necessary number of communication paths between the multiple icons. The communication details include a communication method to be used and the details of data to be communicated.

The processing detail creation section 12 executes a processing detail creation process which creates processing details for each of the multiple icons.

The aforementioned processing configuration description process, the aforementioned communication detail description process, and the aforementioned processing detail creation process are executed in response to a user operation by an operator using the input device 4.

The program creation section 1 creates a program by executing the aforementioned processing configuration description process, the aforementioned communication detail description process, and the aforementioned processing detail creation process, and obtains the program information D6 indicating the details of the created program. The program information D6 is information indicating the multiple icons with specified execution order, the CPU and OS specified for each of the multiple icons, a necessary number of communication paths, and processing details of the multiple icons.

The execution time estimation section 2 includes a processing time estimation section 21 and a communication time estimation section 22 as its main components.

The processing time estimation section 21 refers to the program information D6 to execute a processing time estimation process which obtains an estimated processing time by estimating the processing time of a corresponding process for each of the multiple icons indicated by the program information D6, based on the specified CPU and OS. Thus, multiple processing times corresponding to the multiple icons are obtained by the execution of the processing time estimation process by the processing time estimation section 21.

The communication time estimation section 22 executes a communication time estimation process which obtains an estimated communication time by estimating a communication time for each of a necessary number of communication paths, based on the specified CPU and OS. Thus, a requited number of estimated communication times corresponding to the necessary number of communication paths are obtained by the execution of the communication time estimation process by the communication time estimation section 22.

Thus, the estimated program execution time obtained by the execution time estimation section 2 includes the estimated processing time for each of the multiple icons and the estimated communication time for each of the necessary number of communication paths.

In this manner, the execution time estimation section 2 executes the execution time estimation process including the processing time estimation process and the communication time estimation process to obtain estimated-time-added program information D6t that is the program information D6 with the aforementioned estimated program execution time added thereto.

In the present description, the program information D6 with the aforementioned estimated program execution time added thereto is referred to as "estimated-time-added program information D6t" in some cases. The estimated-time-added program information D6t is information in which the estimated processing time is brought into correspondence with each of the multiple icons and the estimated communication time is brought into correspondence with each of the necessary number of communication paths.

Further, the execution time estimation section 2 determines an estimated overall execution time AT for the entire program from the multiple estimated processing times and the necessary number of estimated communication times, and causes the estimated program execution time to include the estimated overall execution time AT.

Instructions for the start of execution of the processing time estimation process and the communication time estimation process which are included in the execution time estimation process are provided by a user operation using the input device 4.

A program for which the correspondence of the CPUs and OSs by the program creation section 1 is fixed is specified as a fixed program. In the program information D6, information indicating the details of the fixed program is especially referred to as "fixed program information D6f" in some cases. The fixed program information D6f includes the multiple icons, the necessary number of communication paths, the CPUs and OSs fixedly specified for the multiple icons, and the processing details of the multiple icons.

The program conversion section 3 receives the fixed program information D6f, converts the fixed program information D6f into a dedicated program to be executed by the target HW for development, and creates dedicated program information D3 indicating the details of the dedicated program.

The program conversion section 3 includes a processing code generation section 31, a communication code generation section 32, and a setting code generation section 33 as its major components.

The processing code generation section 31 converts the processing of multiple icons indicated in the fixed program information D6f into multiple processing codes for the target HW for development.

The communication code generation section 32 converts a necessary number of communication paths indicated in the fixed program information D6f into a necessary number of communication codes for the target HW for development.

The setting code generation section 33 generates the CPUs and OSs assigned to the multiple icons as multiple OS and CPU codes for the target HW for development, based on indication details of the fixed program information D6f.

Thus, the dedicated program information D3 includes the multiple processing codes, the necessary number of communication codes, and the multiple OS and CPU codes for the target HW for development.

The input device 4 accepts user operations which are operations by an operator, and provides the program environment information D4 at least regarding the number of CPUs in the target HW for development, the types of OSs, and the performance value of each CPU to the program creation section 1. All or part of the program environment information D4 may be taken in from outside via the input device 4.

Further, the program creation section 1, the execution time estimation section 2, and the program conversion section 3 are operable by a user operation using the input device 4.

The display device 5 displays the details of the program information D6 or the estimated-time-added program information D6t on a screen in a manner visually recognizable by an operator.

Figure 18:
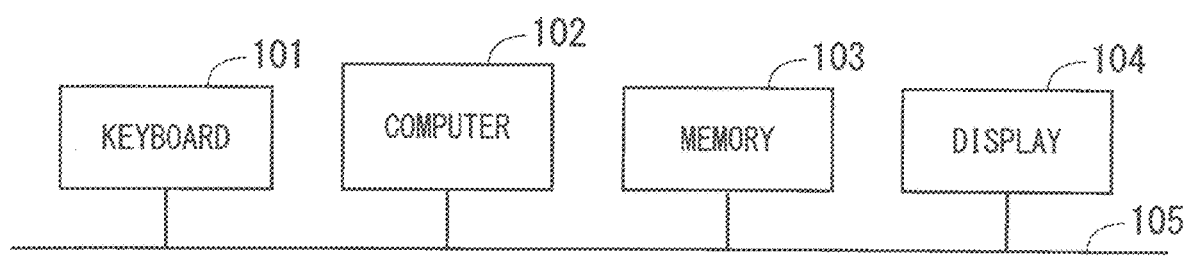
FIG. 18 is a block diagram schematically showing a hardware configuration of the program creation assistance device according to the first to third embodiments.

FIG. 18 is a block diagram schematically showing a hardware configuration of the program creation assistance device 71. As shown in FIG. 18, a keyboard 101, a computer 102, a memory 103, and a display 104 are connected to a bus 105 for sending and receiving data.

The computer 102 has a CPU (known also as a central processing unit, a central processor, a processor, an arithmetic unit, a microprocessor, a microcomputer, a processor, or a DSP) that executes application programs stored in the memory 103 or inside.

Conceivable examples of the memory 103 include nonvolatile or volatile semiconductor memories such as a RAM, a ROM, a flash memory, an EPROM, and an EEPROM. In addition, the memory 103 may be a magnetic disk, a flexible disk, an optical disk, a compact disk, a mini disk, a DVD, or any other storage medium for use in the future.

The program creation section 1, the execution time estimation section 2, and the program conversion section 3 are all implemented by the computer 102 executing the application programs. The input device 4 corresponds to the keyboard 101 connected to the computer 102, and also includes a mouse not shown in FIG. 18. When at least part of the program environment information D4 is taken from outside, the input device 4 includes an input port.

The display device 5 corresponds to the display 104 connected to the computer 102 through the bus 105. The program information D6 is recorded in the memory 103 or a recording device in the computer 102.

Figure 2:
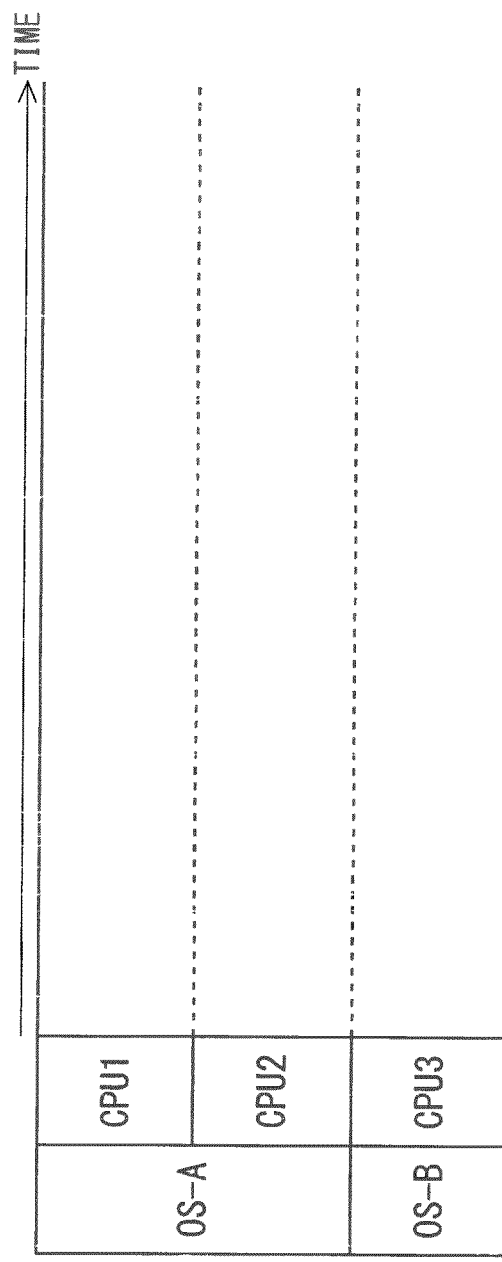
FIG. 2 is an illustration showing the concept of a chart (initial state) created by a chart creation section shown in FIG. 1.

FIG. 2 is an illustration showing the concept of a chart (initial state) created by the chart creation section 11. As shown in FIG. 2, the chart creation section 11 displays on the screen of the display device 5 a chart including the information about the CPUs and OSs for the target HW for development which is provided as the program environment information D4 from the input device 4, an area for assigning processes to the CPUs and OSs, and a time axis for making the processing time and the communication time intuitively understandable.

In the processing configuration description section 111 which is a main component of the chart creation section 11, icons are placed in areas corresponding to the CPUs and OSs to allow selection of the CPUs and OSs executing the processes corresponding to the icons.

In the example shown in FIG. 2, "CPU1" and "CPU2" are assigned for "OS-A", and "CPU3" is assigned for "OS-B". In this case. The program environment information D4 indicates the "CPU1" to "CPU3", "OS-A", and "OS-B" as the configurations of CPUs and OSs.

The order of execution of icons is determined by connecting the icons to each other. In addition, a pin can be added to an icon to indicate the presence of data to be outputted from the icon or to be inputted to the icon.

Figure 3:
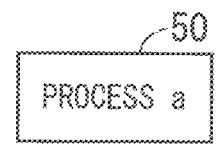
FIG. 3 is an illustration showing an image of a single icon.

FIG. 3 is an illustration showing an image of a single icon. FIG. 4 is an illustration showing an image of a communication path between icons.

As shown in FIG. 3, an icon 50 is set in corresponding relation to a process a. As shown in FIG. 4, icons 51 and 52 are set in corresponding relation to processes A and B, respectively. In addition, a pin 61 on the output side of the icon 51 and a pin 62 on the input side of the icon 52 are connected to each other by a communication path CP1. The communication path CP1 indicates that communication processing is performed from the icon 51 to the icon 52.

With regard to a pair of icons, the connection is established in this manner between the pin on the output side of one icon and the pin on the input side of the other icon to thereby indicate the presence of the communication path from the one icon to the other icon.

The communication detail description section 112 which is a main component of the chart creation section 11 describes the communication details of a communication path CP between the icons created in the processing configuration description section 111. For the communication path CP connecting the pins on the chart, the communication details are described in a separate window different from the chart.

Figure 5:
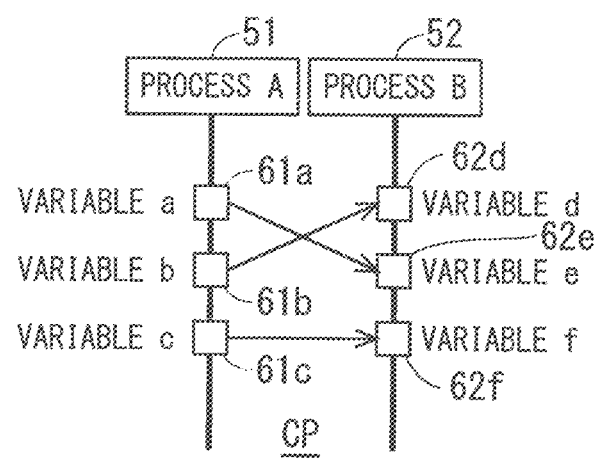
FIG. 5 is an illustration showing an image of a communication path displayed in a separate window.

FIG. 5 is an illustration showing an image of the communication path displayed in the separate window. As shown in FIG. 5, the communication path CP from the "process A" indicated by the icon 51 to the "process B" indicated by the icon 52 is described.

As shown in FIG. 5, variables a to c which become output data are outputted from pins $61a$ to $61c$ on the output side of the icon 51. On the other hand, pins $62d$ to $62f$ on the input side of the icon 52 receive variables d to f as input data. At this time, the variable a outputted from the icon 51 is inputted to the pin $62e$ as the variable e in the icon 52; the variable b outputted from the icon 51 is inputted to the pin $62d$ as the variable d in the icon 52; and the variable c outputted from the icon 51 is inputted to the pin $62f$ as the variable f in the icon 52.

In this manner, FIG. 5 shows that the communication path CP is provided between the icons 51 and 52 for data communication between the variables a to c and the variables d to f.

The communication method to be used may be determined for each communication path CP. For example, displaying the name of the communication method near a line indicating the communication path CP enables an operator to intuitively recognize the communication method. Also, the line type indicating the communication path CP may be displayed with different details for each communication method.

Examples of the communication method include a socket, a shared memory, and a pipe. The socket is a communication method capable of bidirectional communication and is more reliable than the communication using the shared memory. The pipe is a communication method capable of only unidirectional communication but is simpler than the socket. The communication using the shared memory is a method in which data is stored in a memory accessible by both a sender and a receiver, and data is passed between the sender and the receiver.

The communication method using the shared memory is the fastest from the viewpoint of communication speed, but has the disadvantage of low reliability if implementation is incorrect, such as fatal errors if the address to be accessed is incorrect.

The socket and the pipe, on the other hand, are higher in reliability but slower in communication speed. Thus, which of the multiple communication methods including the socket, the shared memory, and the pipe is to be used is on a case-by-case basis.

For selection from the multiple communication methods, the program environment information D4 includes the multiple communication methods to be selected.

Figure 6:
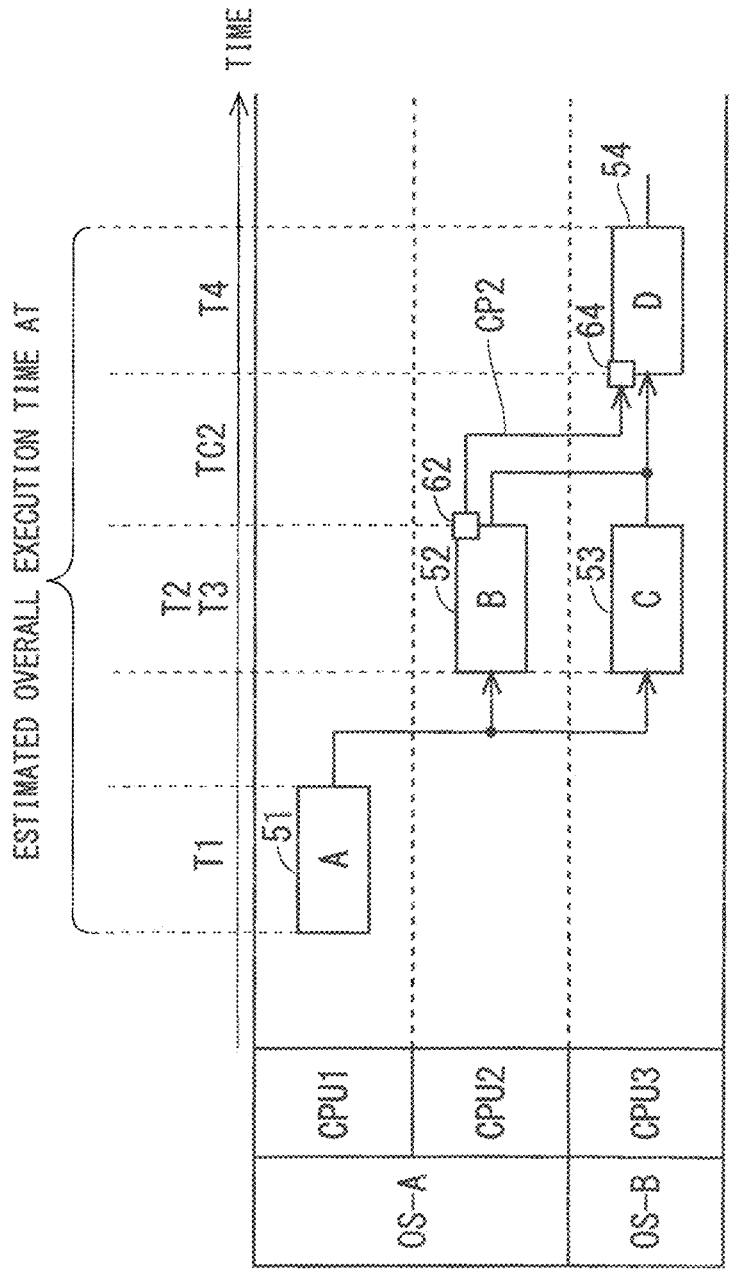
FIG. 6 is an illustration schematically showing an example of the chart created by the chart creation section shown in FIG. 1.

FIG. 6 is an illustration schematically showing an example of the chart (creation stage) created by the chart creation section 11. In the example shown in FIG. 6, four icons 51 to 54 are set in corresponding relation to processes A to D.

The icon 51 is assigned to "CPU1", and the icon 52 is assigned to "CPU2". The icons 53 and 54 are assigned to "CPU3".

Arrows indicating the order of execution from the icon 51 to the icons 52 and 53 are shown, and arrows indicating the order of execution from the icons 52 and 53 to the icon 54 are shown. Thus, FIG. 6 shows that, among the icons 51 to 54, the order of execution is as follows: the icon 51, the icons 52 and 53, and the icon 54. The icons 52 and 53 are parallel processes executed by "CPU2" and "CPU3".

The pin 62 on the output side of the icon 52 and a pin 64 on the input side of the icon 54 are connected to each other by a communication path CP2. Thus, FIG. 6 shows that a communication process is performed between the icons 52 and 54 through the communication path CP2.

The processing details corresponding to the respective icons are created by the processing detail creation section 12. The created processing details may be in a chart form using icons similar to those of the chart creation section 11 or may be in a form created by an external tool. The created processing details are managed in corresponding relation to the icons.

The program information D6 created by the program creation assistance device 71 includes information indicating multiple icons, a necessary number of communication paths, processing details of the multiple icons, OSs and CPUs corresponding to the multiple icons, and a procedure for the execution of the multiple icons.

In the example of FIG. 6, the icons 51 to 54 correspond to the multiple icons, and the communication path CP1 corresponds to the necessary number of communication paths. The arrows between the icons 51 to 54 indicate the procedure for the execution of the multiple icons, and the positions at which the icons 51 to 54 are placed specify the OSs and CPUs that execute the icons 51 to 54.

The execution time estimation section 2 receives the program information D6 created in the program creation section 1, and executes the execution time estimation process for obtaining the estimated program execution time for the program indicated by the program information D6.

The estimated program execution time includes the estimated processing time for each of the multiple icons, the estimated communication time for each of the necessary number of communication paths, and the estimated overall execution time AT. The estimated processing times for the multiple icons are hereinafter referred to generically as "multiple estimated processing times", and the estimated communication times for the necessary number of communication paths are hereinafter referred to generically as a "necessary number of estimated communication times", in some cases.

The aforementioned estimated overall execution time AT is obtained by an arithmetic process including addition based on the multiple estimated processing times and the necessary number of estimated communication times.

Based on the program information D6, the execution time estimation section 2 obtains the estimated-time-added program information D6t in which information indicating the estimated program execution time including the estimated overall execution time AT, the multiple estimated processing times, and the necessary number of estimated communication times is added to the program information D6. The estimated-time-added program information D6t is sent to the program creation section 1 and the program conversion section 3, as appropriate.

When the estimated-time-added program information D6t is obtained by the execution time estimation section 2, the estimated-time-added program information D6t is provided to the display device 5 via the program creation section 1.

Thus, as shown in FIG. 6, estimated processing times T1 to T4 corresponding to the icons 51 to 54, an estimated communication time TC2 corresponding to the communication path CP2, and the estimated overall execution time AT are displayed on the screen of the display device 5.

The processing time estimation process is performed by the processing time estimation section 21 as a simulation using a hardware simulator or as an arithmetic process based on the previously evaluated relationship between the number of steps and the execution speed, based on the number of steps necessary for the process and the performance of CPUs executing the icons, by reference to the processing details of the icons. The processing details of the icons are created by the processing detail creation section 12.

The communication time estimation process is performed by the communication time estimation section 22, based on the variables communicated on each communication path and the communication method thereof. For example, the communication time estimation process is executed by using the previously evaluated relationship between the amount of data to be communicated, the communication method, and the communication time for a selected communication method. The communication method and the communication details of each communication path are created by the communication detail description section 112.

The estimated overall execution time AT is the sum of the estimated processing times of the respective icons and the communication times in the respective communication paths CP as a result of tracing the connected icons sequentially from the starting icon at the left end of the chart to the ending icon at the right end. If multiple routes can be traced from the starting icon to the ending icon, the worst value among the estimated execution times of the multiple routes is used as the estimated overall execution time AT.

The fixed program information D6f created in the program creation section 1 and indicating the details of the fixed program for which the assignment of the OSs and CPUs is completed is provided to the program conversion section 3. The program conversion section 3 converts the fixed program indicated by the fixed program information D6f into a dedicated program to be executed by the target HW for development, and outputs the dedicated program information D3 indicating the dedicated program.

The dedicated program information D3 includes the multiple processing codes, the necessary number of communication codes, and the multiple OS and CPU codes which are to be executed by the target HW for development, as described above.

FIG. 7 is a flow diagram showing a procedure for a program creation process using the program creation assistance device 71 of the first embodiment.

With reference to FIG. 7, a procedure for program development using the program creation assistance device 71 of the first embodiment will be described.

The program creation process is commenced by starting the program creation assistance device 71 of the first embodiment.

First, in Step S11, an operator provides the program environment information D4 about the target HW for development from the input device 4 to the program creation section 1. The program environment information D4 includes the number of CPUs to be used by the target HW for development, the performance of the CPUs, the types of OSs, and the like. The program environment information D4 usually indicates multiple CPUs and multiple OSs.

Next, in Step S12, the processing configuration description process is performed by the processing configuration description section 111 to describe processes desired to be executed in the target HW for development by using icons.

Thereafter, in Step S13, the processing detail creation process is performed by the processing detail creation section 12 to create the processing details for the icons described in Step S12. The processing details may be created using other external tools without using the processing detail creation section 12.

Then, in Step S14, the communication detail description process is performed by the communication detail description section 112 to describe the communication details in each communication path.

Steps S11 to S14 described above provide necessary information as the program information D6. The processes in Steps S11 to S14 are performed in response to a user operation by an operator that is a user using the input device 4.

Thereafter, in Step S15, whether the execution of the program indicated by the program information D6 is to be completed within the execution time required by the operator or not is checked. Step S15 is a checking process by the operator. Step S15 will be described in detail below.

Specifically, the execution time estimation section 2 is caused to execute the execution time estimation process, thereby generating the estimated-time-added program information D6$t$, based on the program information D6. At the same time, the estimated-time-added program information D6$t$ is outputted via the program creation section 1 to the display device 5, whereby the estimated-time-added program information D6$t$ is displayed in a visually recognizable form on the screen of the display device 5.

The operator recognizes the estimated overall execution time AT by reference to foe estimated-time-added program information D6$t$ displayed on the screen of the display device 5 to thereby make a YES/NO judgment in Step S15.

Specifically, if "RT≥AT" is satisfied between a required overall execution time RT required by the operator and the estimated overall execution time AT, the judgment result in Step S15 is YES; and if not, the judgment result in Step S15 is NO.

If the judgment result is YES in Step S15, the current program information D6 is outputted as the fixed program information D6$f$ to the program conversion section 3 in Step S18. As a result, the dedicated program information D3 for the target HW for development is obtainable by a program conversion process using the program conversion section 3. After the execution of Step S18, the process is terminated.

If the judgment result is NO in Step S15, the operator performs a program improvement process in Steps S16 and S17.

First, in Step S16, the details of the estimated-time-added program information D6$t$ are verified. Multiple estimated processing times and a necessary number of estimated communication times in addition to the estimated overall execution time AT are included in the estimated-time-added program information D6$t$.

For example, as shown in FIG. 6, the operator is able to recognize an icon or a communication path adversely affecting the estimated overall execution time AT by reference to the estimated processing times T1 to T4 of the icons 51 to 54 and the communication path CP2.

Next, in Step S17, the operator performs an individual improvement process, based on the verification result of Step S16. For example, the operator changes the OS and CPU assignment or the processing details for the adversely affecting icon. Similarly, the operator changes the OS and CPU assignment or the communication details for the adversely affecting communication path.

In the aforementioned individual improvement process, the change in OS and CPU assignment for each icon is relatively easy and is an effective measure for improving the processing time of each icon and the communication time of each communication path. This is because the processing time of each icon and the communication time of each communication path vary depending on the assigned OSs and CPUs.

Thereafter, the process returns to Step S15 again. Then, if the judgment result is YES in Step S15, the process proceeds to Step S18 and is terminated. On the other hand, if the judgment result is NO in Step S15, the process in Steps S16 and S17 is performed again.

The program creation assistance device 71 of the first embodiment is used as shown in FIG. 7. The operator uses the program creation assistance device 71 to create a program with consideration given to the estimated overall execution time AT, the estimated processing time for each icon, and the estimated communication time for each communication path while setting the OSs and CPUs that execute the processes making up the program.

Thus, the use of the program creation assistance device 71 of the first embodiment makes it relatively easy to develop a program executable within the required overall execution time RT required by the operator.

As mentioned above, the program creation assistance device 71 of the first embodiment causes the processing time estimation section 21 to execute the processing time estimation process and causes the communication time estimation section 22 to execute the communication time estimation process, thereby obtaining the estimated processing time for each of the multiple icons and the estimated communication time for each of the necessary number of communication paths, based on the specified CPUs and OSs.

Thus, the operator as a user is able to change the correspondence of CPUs and OSs with the multiple icons as appropriate to relatively easily recognize the factors adversely affecting the estimated overall execution time AT of the program by reference to the estimated-time-added program information D6$t$ displayed on the screen of the display device 5.

Then, the operator is able to perform the individual improvement process of Step S17 on an icon or a communication path adversely affecting the estimated overall execution time AT of the program.

As a result, the program creation assistance device 71 of the first embodiment effectively assists in the creation of the program to be executed within the required overall execution time RT desired by the operator.

In addition, the program creation assistance device 71 of the first embodiment creates the processing details of each of the multiple icons by the processing detail creation process of the processing detail creation section 12.

Thus, the operator is able to change the processing details of the multiple icons as appropriate in addition to the correspondence of CPUs and OSs with the multiple icons to reference the estimated-time-added program information D6$t$ displayed on the screen of the display device 5.

As a result, the program creation assistance device 71 of the first embodiment more extensively assists in the creation of the program to be executed within the required overall execution time RT desired by the operator.

Furthermore, the program creation assistance device 71 of the first embodiment has the program conversion section 3. This allows the program creation assistance device 71 of the first embodiment to automatically obtain the dedicated program information D3 indicating the dedicated program for the target HW for development operating within the required overall execution time RT desired by the operator.

Second Embodiment

Figure 8:
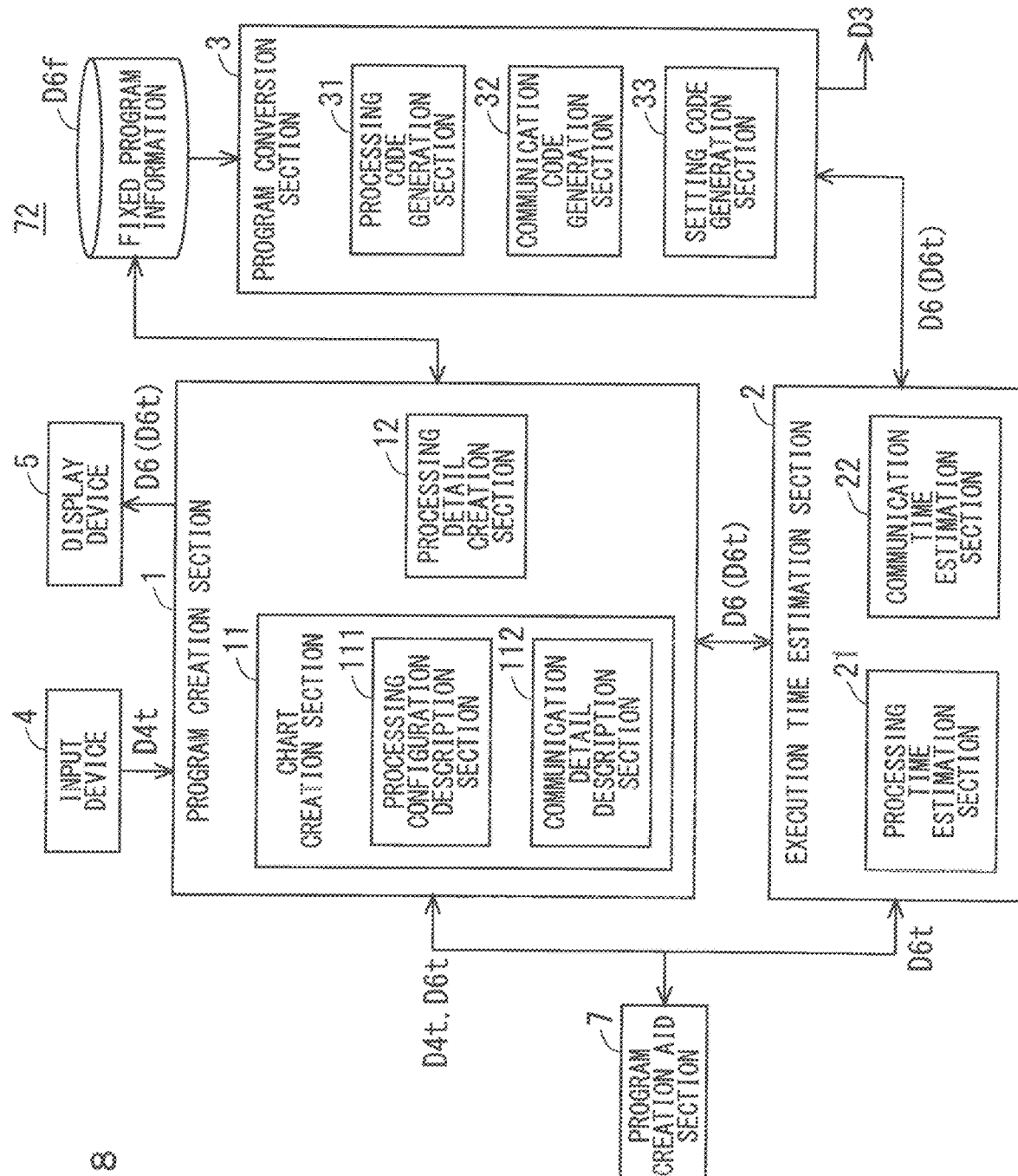
FIG. 8 is a block diagram showing a configuration of the program creation assistance device according to a second embodiment.

FIG. 8 is a block diagram showing a configuration of a program creation assistance device 72 according to a second embodiment of the present disclosure. As shown in FIG. 8, the program creation assistance device 72 of the second embodiment is characterized by the addition of a program creation aid section 7 to the program creation assistance device 71 of the first embodiment.

The same components shown in FIG. 8 as those of the first embodiment shown in FIG. 1 are designated by the same reference numerals and characters as appropriate, and will not be described. Features of the second embodiment will be mainly described.

The input device 4 accepts new indication information indicating the start of an assignment aid process of the program creation aid section 7.

In the second embodiment, the program environment information D4 provided from the input device 4 is extended to required-time-added program environment information D4t. The required-time-added program environment information D4t includes required execution time information indicating the required overall execution time RT of a program, multiple required processing times corresponding to multiple processes, and a necessary number of required communication times corresponding to a necessary number of communication paths, in addition to the program environment information D4.

The hardware configuration of the second embodiment is also shown in FIG. 18, as in the first embodiment. However, the newly added program creation aid section 7 is implemented by the computer 102 executing an application program.

Figure 9:
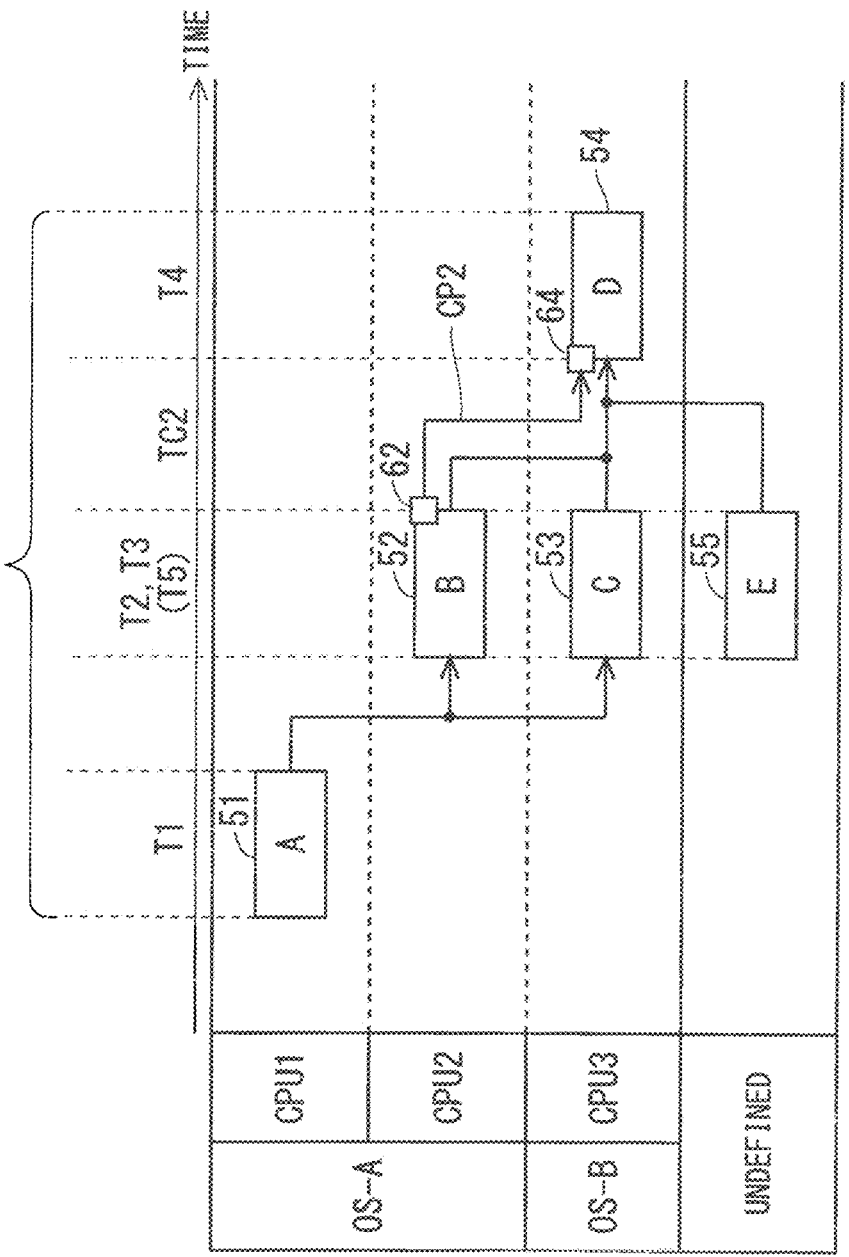
FIG. 9 is an illustration schematically showing an example of the chart created by the chart creation section shown in FIG. 8.

FIG. 9 is an illustration schematically showing an example of the chart created by the chart creation section 11. In the example shown in FIG. 9, five icons 51 to 55 are set in corresponding relation to processes A to H. Also, "CPU1" and "CPU2" are assigned for "OS-A", and "CPU3" is assigned for "OS-B".

The icon 51 is assigned to "CPU1", and the icon 52 is assigned to "CPU2". The icons 53 and 54 are assigned to "CPU3". On the other hand, OSs and CPUs are not assigned to the icon 55, so that the icon 55 is in an undefined state. In other words, the icon 55 is an unspecified icon.

Arrows indicating the order of execution from the icon 51 to the icons 52 and 53 are shown, and arrows indicating the order of execution from the icons 52 and 53 to the icon 54 are shown. An arrow indicating the order of execution from the icon 55 to the icon 54 is shown.

Thus, FIG. 9 shows that, among the icons 51 to 55, the order of execution is as follows: the icon 51, the icons 52, 53 and 55, and the icon 54. The icons 52, 53 and 55 are parallel processes.

The pin 62 on the output side of the icon 52 and the pin 64 on the input side of the icon 54 are connected to each other by the communication path CP2. Thus, FIG. 9 shows that a communication process is performed between the icons 52 and 54 through the communication path CP2.

In FIG. 9, the icon 55 is an unspecified icon for which CPUs and OSs are not specified, as mentioned above, if the icon 55 has a communication path not shown in FIG. 9, the communication path for the icon 55 is an unspecified communication path. If a CPU or an OS for at least one of the multiple icons communicating through a communication path is not specified, such a communication path is an unspecified communication path.

On the other hand, if there is an icon that does not satisfy the required processing times RT1 to RT4 of the icons 51 to 54 among the estimated processing times T1 to T4 of the icons 51 to 54, such an icon is an unsatisfactory icon to be described later.

Further, if the estimated communication time TC2 of the communication path CP2 docs not satisfy a required communication time RTC2, the communication path CP2 is an unsatisfactory communication path to be described later.

The program creation aid section 7 receives the program information D6 directly from the program creation section 1, and receives the required-time-added program environment information D4t from the input device 4 via the program creation section 1. The program creation aid section 7 further receives the estimated-time-added program information D6t from the execution time estimation section 2, as appropriate.

The program creation aid section 7 receives the required-time-added program environment information D4t and the program information D6, and refers to the estimated program execution time included in the estimated-time-added program information D6t to execute a program creation aid process to be described later.

If there is an unspecified icon for which a CPU or an OS is not specified among the multiple icons indicated by the program information D6, the program creation aid section 7 recognizes such an icon as at least one unspecified icon.

Furthermore, if the estimated processing time for each of the multiple icons does not satisfy the corresponding required processing time among the multiple required processing times, the program creation aid section 7 recognizes such an icon as at least one unsatisfactory icon.

In addition, if the estimated communication time for each of the necessary number of communication paths does not satisfy the corresponding required processing time among a necessary number of required estimated times, the program creation aid section 7 recognizes such a communication path as at least one unsatisfactory communication path.

When at least one unspecified icon is present, the program creation aid section 7 executes a first assignment aid process as the program creation aid process.

The first assignment aid process is the process of automatically assigning a CPU and an OS to each of the at least one unspecified icon so as to satisfy indication details of the required execution time information including the required overall execution time RT, the multiple required processing times, and the necessary number of required communication times.

The program creation aid section 7 is capable of causing the execution time estimation section 2 to execute the execution time estimation process as appropriate during the execution of the first assignment aid process. Thus, the program creation aid section 7 is capable of verifying whether the required execution time information is to be satisfied for an icon or a communication path to which the CPU and OS assignment is added or not by reference to the estimated-time-added program information D6t created by the execution time estimation section 2.

If at least one unsatisfactory icon or at least one unsatisfactory communication path is present, the program creation aid section 7 executes a second assignment aid process as the program creation aid process.

The second assignment aid process is the process of automatically assigning a CPU and an OS to each of the at least one unsatisfactory icon and the at least one unsatisfactory communication path so as to satisfy indication details of the required execution time information including the required overall execution time RT, the multiple required processing times, and the necessary number of required communication times.

In the second assignment aid process, the assignment of a CPU and an OS to at least one unsatisfactory communication path means changing the CPU and OS assignment details of at least one of the pair of icons between which the unsatisfactory communication path is formed.

As mentioned above, the program creation aid section 7 is capable of causing the execution time estimation section 2 to execute the execution time estimation process as appropriate during the execution of the second assignment aid process. Thus, the program creation aid section 7 is capable of verifying whether the required execution time information is to be satisfied for an icon or a communication path to which the CPU and OS assignment is changed or not by reference to the estimated-time-added program information D6t created by the execution time estimation section 2.

In the program indicated by the program information D6, the input-to-output derivation from the starting icon to the ending icon is formulated as a constraint satisfaction problem, and the solution is derived by a SAT (Boolean satisfiability testing) solver or by a learner that has been previously trained by machine learning.

Thus, the program creation aid section 7 applies a technique for solving the constraint satisfaction problem by means of the SAT solver or the learner to automatically perform the aforementioned first and second assignment aid processes.

Figure 10:
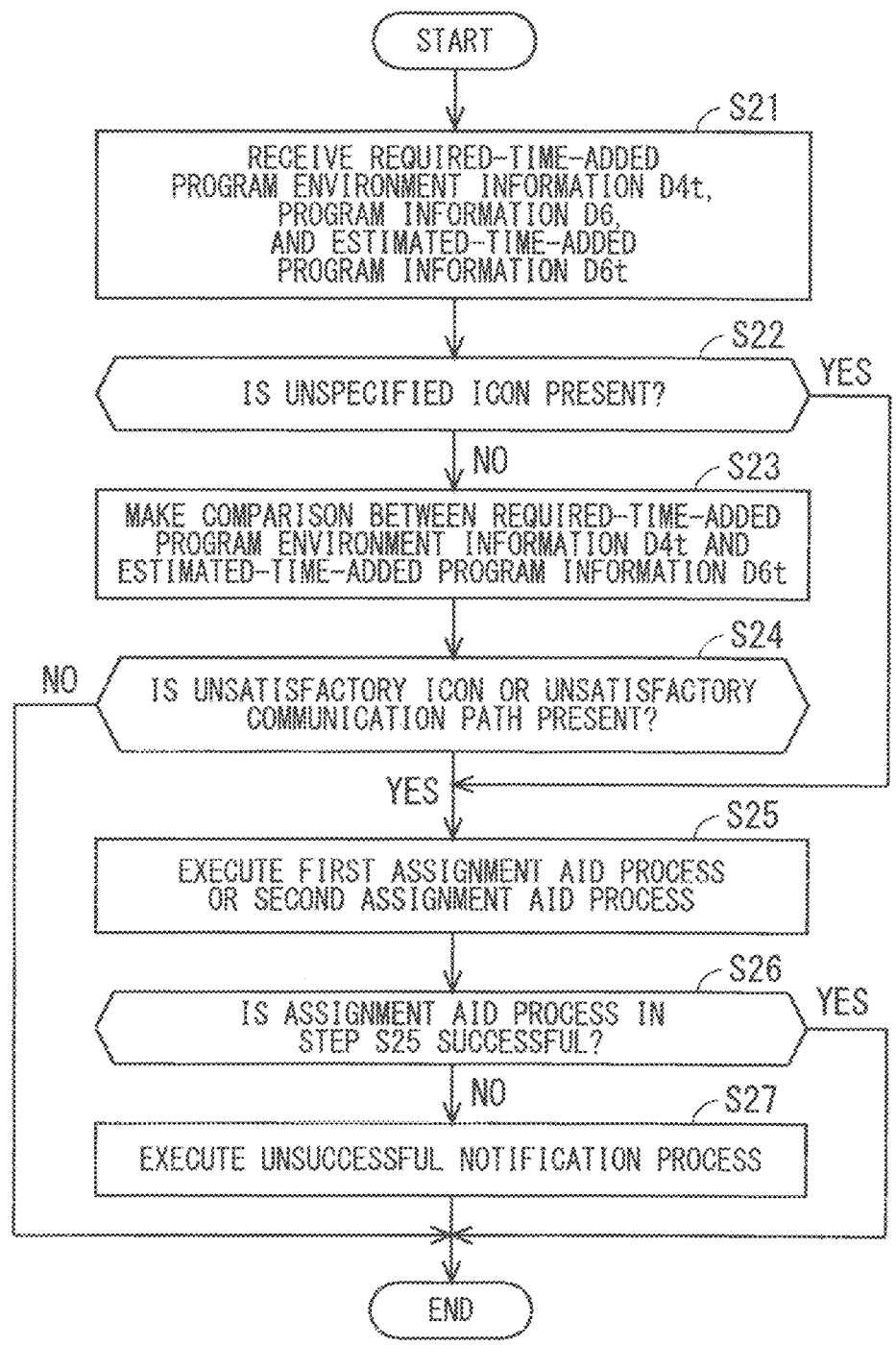
FIG. 10 is a flow diagram showing a procedure for the execution of an internal process by a program creation aid section shown in FIG. 8.

FIG. 10 is a flow diagram showing a procedure for the execution of a program creation aid process by the program creation aid section 7. The details of the operation of the program creation aid section 7 will be described with reference to FIG. 10.

Information indicating the start of the operation of the program creation aid section 7 is provided from the input device 4, whereby the operation of the program creation aid section 7 is commenced.

In Step S21, the program creation aid section 7 receives the program information D6, the required-time-added program environment information D4t, and the estimated-time-added program information D6t. The program creation aid section 7 receives the program information D6 from the program creation section 1, receives the required-time-added program environment information D4t from the input device 4 via the program creation section 1, and receives the estimated-time-added program information D6t from the execution time estimation section 2.

In Step S22, the program creation aid section 7 checks whether an unspecified icon for which a CPU or an OS is not specified is present or not, based on the program information D6. If the unspecified icon is present (YES) in Step S22, the process proceeds to Step S25. If the unspecified icon is not present (NO) in Step S22, the process proceeds to Step S23.

In Step S23 which is performed if the judgment result is NO in Step S22, a comparison is made between the required-time-added program environment information D4t and the estimated-time-added program information D6t.

The required execution time information in the required-time-added program environment information D4t includes multiple required processing times and a necessary number of required communication times, and the estimated-time-added program information D6t includes multiple estimated processing times and a necessary number of estimated communication times.

In Step S24, the program creation aid section 7 checks whether an unsatisfactory icon and an unsatisfactory communication path are present or not. If the unsatisfactory icon or the unsatisfactory communication path is present (YES), the process proceeds to Step S2S. If the unsatisfactory icon and the unsatisfactory communication path are not present (NO), the process is terminated.

The program creation aid section 7 is capable of determining the presence or absence of the unsatisfactory icon, based on the result of comparison between the multiple required processing times and the multiple estimated processing times, and capable of determining the presence or absence of the unsatisfactory communication path, based on the result of comparison between the necessary number of required communication times and the necessary number of estimated communication times.

In Step S25, the program creation aid section 7 executes the first assignment aid process or the second assignment aid process. After the judgment result is YES in Step S22, the first assignment aid process is executed. After the judgment result is YES in Step S24, the second assignment aid process is executed.

As mentioned above, the first and second assignment aid processes are the processes of executing the assignment of icons to CPUs and OSs with the use of the aforementioned SAT solver or learner so as to satisfy the indication details of the required execution time information including the required overall execution time RT, the multiple required processing times, and the necessary number of required communication times.

Then, in Step S26, the program creation aid section 7 checks whether the first or second assignment aid process executed in Step S25 is successful or not. If the first or second assignment aid process is successful (YES), the process is terminated. Specifically, if the first or second assignment aid process in Step S25 results in the CPU and OS assignment to multiple icons while satisfying the indication details of the required execution time information, the judgment result is YES in Step S26; otherwise, the judgment result is NO in Step S26.

On the other hand, if the successful result is not found (NO) in Step S26, an unsuccessful notification process is executed in Step S27 to notify that the assignment aid process has been unsuccessful. The unsuccessful notification process is executed, for example, by displaying information indicating an unsuccessful result on the display device 5 from the program creation aid section 7 via the program creation section 1.

In the flow diagram of the program creation aid process shown in FIG. 10, one of the first and second assignment aid processes is selectively executed in the procedure. In other words, the second assignment aid process is executed only if the judgment result in Step S22 is YES and the judgment result in Step S24 is YES.

The procedure shown in FIG. 10 may be changed so that the first and second assignment aid processes are performed together. Specifically, the procedure may be changed so that the second assignment aid process is executed even if the judgment result in Step S22 is NO but the judgment result in Step S24 is YES.

Figure 11:
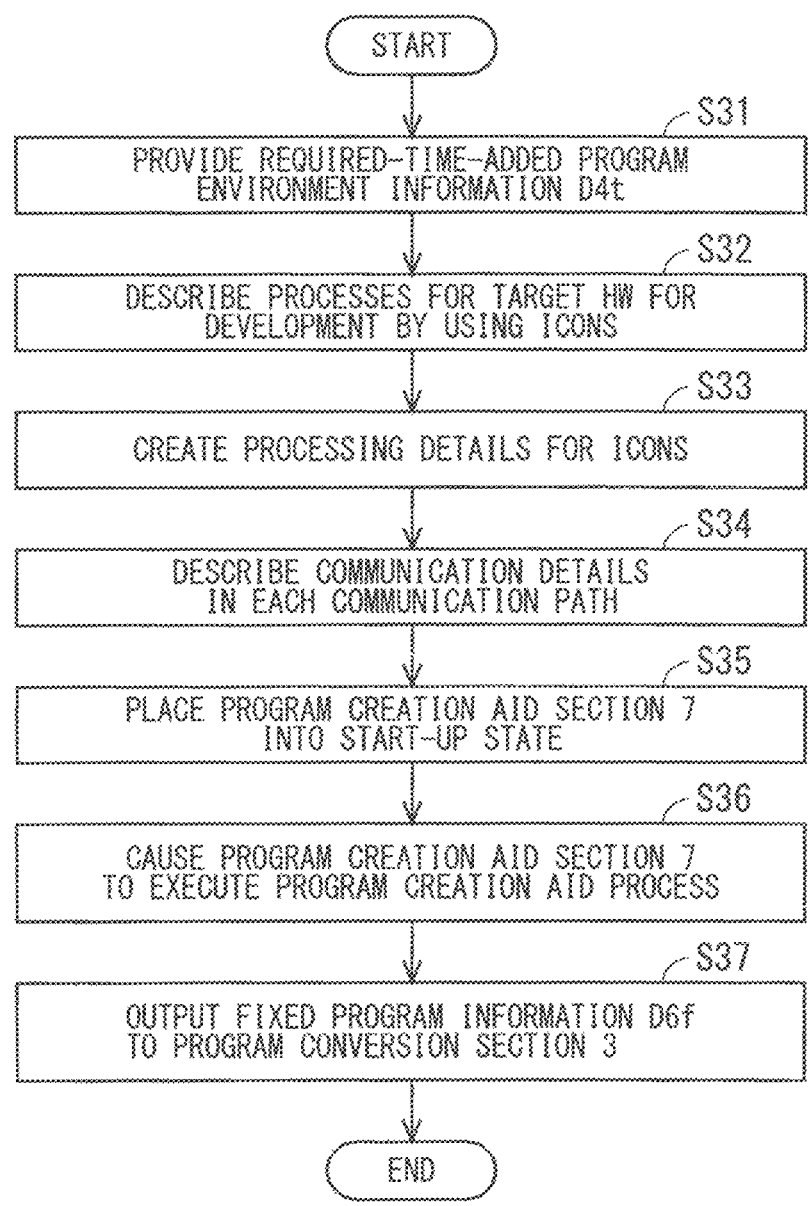
FIG. 11 is a flow diagram showing a procedure for the program creation process using the program creation assistance device of the second embodiment.

FIG. 11 is a flow diagram showing a procedure for the program creation process using the program creation assistance device 72 of the second embodiment.

With reference to FIG. 11, a procedure for program development using the program creation assistance device 72 of the second embodiment will be described.

First, in Step S31, an operator provides the required-time-added program environment information D4t about the target HW for development by means of the input device 4 to the program creation section 1.

The processes in Steps S32 to S34 and S37 are performed in the same manner as the processes in Steps S12 to S14 and S18 of the first embodiment shown in FIG. 7.

In Step S35 which is executed after Step S34, the program creation aid section 7 is placed into a start-up state. Specifically, information indicating the start of the operation of the program creation aid section 7 is provided from the input device 4.

Then, in Step S36, the program creation aid process is executed by the program creation aid section 7. The program creation aid process includes the first and second assignment aid processes shown in FIG. 10.

Finally, the current program information D6 is outputted as the fixed program information D6f to the program conversion section 3 in Step S37. As a result, the dedicated program information D3 for the target HW for development is obtainable by the program conversion process using the program conversion section 3. After the execution of Step S37, the process is terminated.

Step S37 is executed when the program creation aid process shown in FIG. 10 results in YES in Step S26, and is not executed when the program creation aid process results in NO in Step S26.

The program creation assistance device 72 of the second embodiment allows the operator as a user to easily develop a program satisfying the indication details of the required execution time information desired by the operator even if there is an unspecified icon for which an OS or a CPU executing each process constituting the program is not specified.

As mentioned above, the program creation assistance device 72 of the second embodiment is characterized by having the program creation aid section 7 that executes the program creation aid process. The first and second assignment aid processes are included in the program creation aid process.

In the program creation assistance device 72 of the second embodiment, the program creation aid section 7 executes the first assignment aid process which automatically assigns a CPU and an OS to each of the at least one unspecified icon so as to satisfy the indication details of the required execution time information including the required overall execution time RT, the multiple required processing times, and the necessary number of required communication times.

The program creation assistance device 72 of the second embodiment is hence capable of automatically creating a program satisfying the indication details of the required execution time information without placing a burden on the operator as the user even if the unspecified icon is present.

Thus, the program creation assistance device 72 of the second embodiment is capable of automatically creating a program satisfying the indication details of the required execution time information even if the multiple icon are all unspecified icons.

The program creation aid section 7 further executes the second assignment aid process which automatically assigns a CPU and an OS to each of the at least one unsatisfactory icon and the at least one unsatisfactory communication path so as to satisfy the indication details of the required execution time information.

The program creation assistance device 72 of the second embodiment is hence capable of automatically creating a program satisfying the indication details of the required execution time information without placing a burden on the operator as the user even if the unsatisfactory icon and the unsatisfactory communication path are present.

Third Embodiment

When an industrial PC (Personal Computer) or the like is used to execute control processing of a device and data collection and data analysis processing from the device in a single controller, the control processing is often executed by a real-time OS whereas the data analysis processing is executed by a general-purpose OS. In such cases, the execution time of the processing executed by tire general-purpose OS has a wide variation range. This necessitates estimation and program development that take into account the variations in execution time. A third embodiment to be described below assumes the processing executed by the general-purpose OS.

Figure 12:
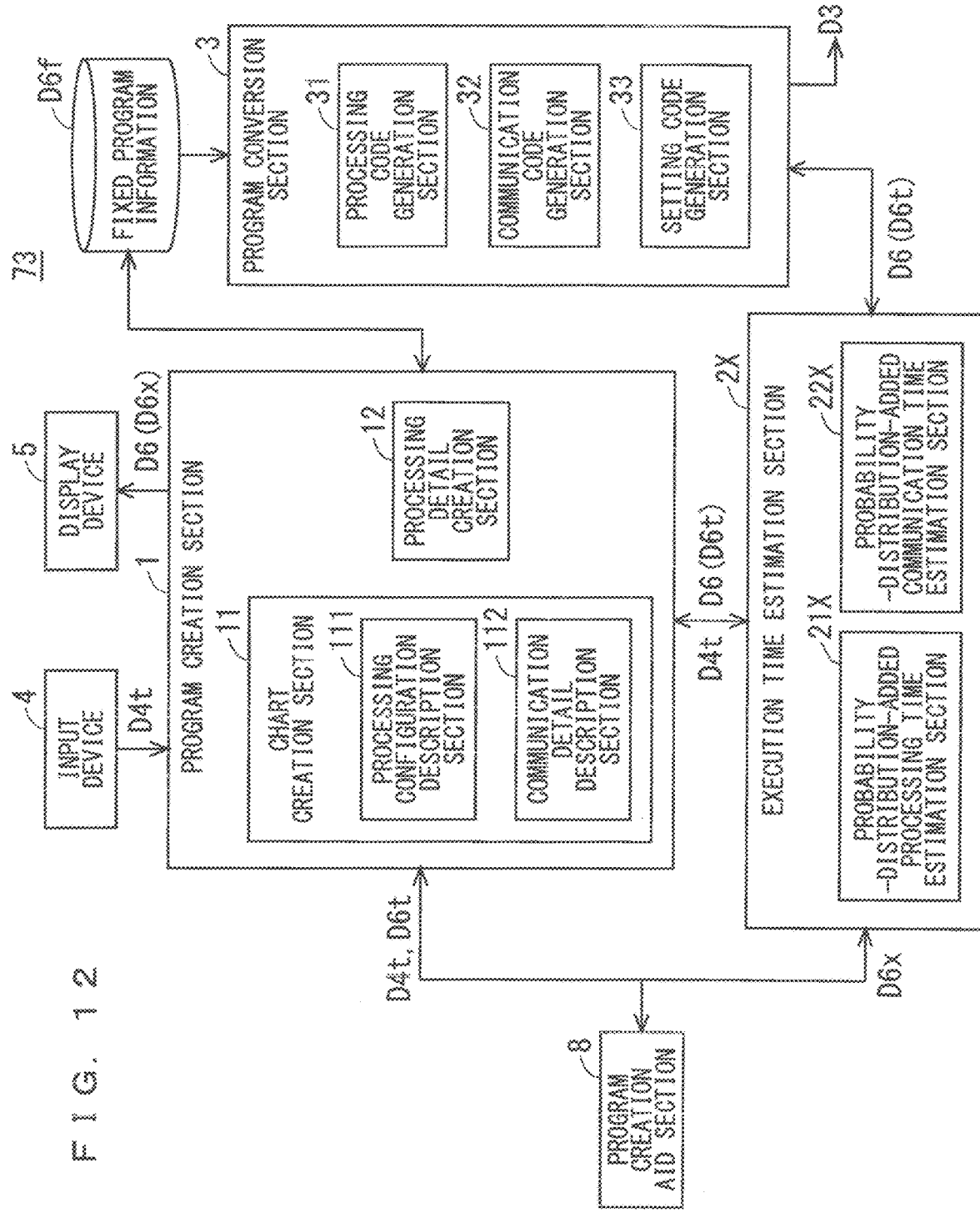
FIG. 12 is a block diagram showing a configuration of the program creation assistance device according to a third embodiment.

FIG. 12 is a block diagram showing a configuration of a program creation assistance device 73 according to the third embodiment of the present disclosure. As shown in FIG. 12, the program creation assistance device 73 of the third embodiment is characterized in that the execution time estimation section 2 and the program creation aid section 7 in the program creation assistance device 72 of the second embodiment are replaced with an execution time estimation section 2X and a program creation aid section 8.

The same components shown in FIG. 12 as those of the first and second embodiments shown in FIGS. 1 and 8 are designated by the same reference numerals and characters as appropriate, and will not be described. Features of the third embodiment will be mainly described.

The execution time estimation section 2X receives the required-time-added program environment information D4t and the program information D6 to execute an execution time estimation process for obtaining an estimated program execution time with a probability distribution added thereto for a program.

The execution time estimation section 2X includes a probability-distribution-added processing time estimation section 21X and a probability-distribution-added communication time estimation section 22X as its main components.

The probability-distribution-added processing time estimation section 21X refers to the required-time-added program environment information D4t and the program information D6 to execute a processing time estimation process which obtains a probability-distribution-added estimated processing time by estimating the processing time of a corresponding process for each of the multiple icons indicated by the program information D6, based on the specified CPU and OS.

Thus, multiple probability-distribution-added estimated processing times corresponding to the multiple icons are obtained by the execution of the processing time estimation process by the probability-distribution-added processing time estimation section 21X. The probability distribution of the multiple estimated processing times corresponding to the multiple icons is recognized from the multiple probability-distribution-added estimated processing times. The multiple probability-distribution-added estimated processing times include the probability of satisfying the corresponding multiple required processing times.

The probability-distribution-added communication time estimation section 22X refers to the required-time-added program environment information D4t and the program information D6 to execute a communication time estimation process which obtains a probability-distribution-added estimated communication time by estimating a communication time for each of a necessary number of communication paths indicated by the program information D6, based on the specified CPU and OS.

Thus, multiple probability-distribution-added estimated communication times corresponding to the necessary number of communication paths are obtained by the execution of the communication time estimation process by the probability-distribution-added communication time estimation section 22X. The probability distribution of a necessary number of estimated communication times corresponding to the necessary number of communication paths is recognized from the multiple probability-distribution-added estimated communication times. The multiple probability-distribution-added estimated communication times include the probability of satisfying the corresponding multiple required communication times.

Thus, the estimated program execution time obtained by the execution time estimation section 2X includes the multiple probability-distribution-added estimated processing times corresponding to the multiple icons, and a necessary number of probability-distribution-added estimated communication times corresponding to the necessary number of communication paths.

The execution time estimation section 2X outputs the estimated-time-added program information D6t that is the program information D6 with the aforementioned estimated program execution time added thereto.

The estimated-time-added program information D6t includes information indicating the probability of satisfying a corresponding required communication time for each of the multiple estimated processing times and the probability of satisfying a corresponding required communication time for each of the necessary number of estimated communication times.

In addition, probability-distribution-added program information D6x includes information indicating the probability distribution of the estimated overall execution time AT and the probability that the estimated overall execution time AT satisfies the required overall execution time RT.

The processing time estimation process by the probability-distribution-added processing time estimation section 21X and the communication time estimation process by the probability-distribution-added communication time estimation section 22X are performed, for example, by repeating a simulation considering the specified OS and CPU, estimating the estimated processing time and the estimated communication time many times, and performing statistical processing based on the estimation results.

Figure 13:
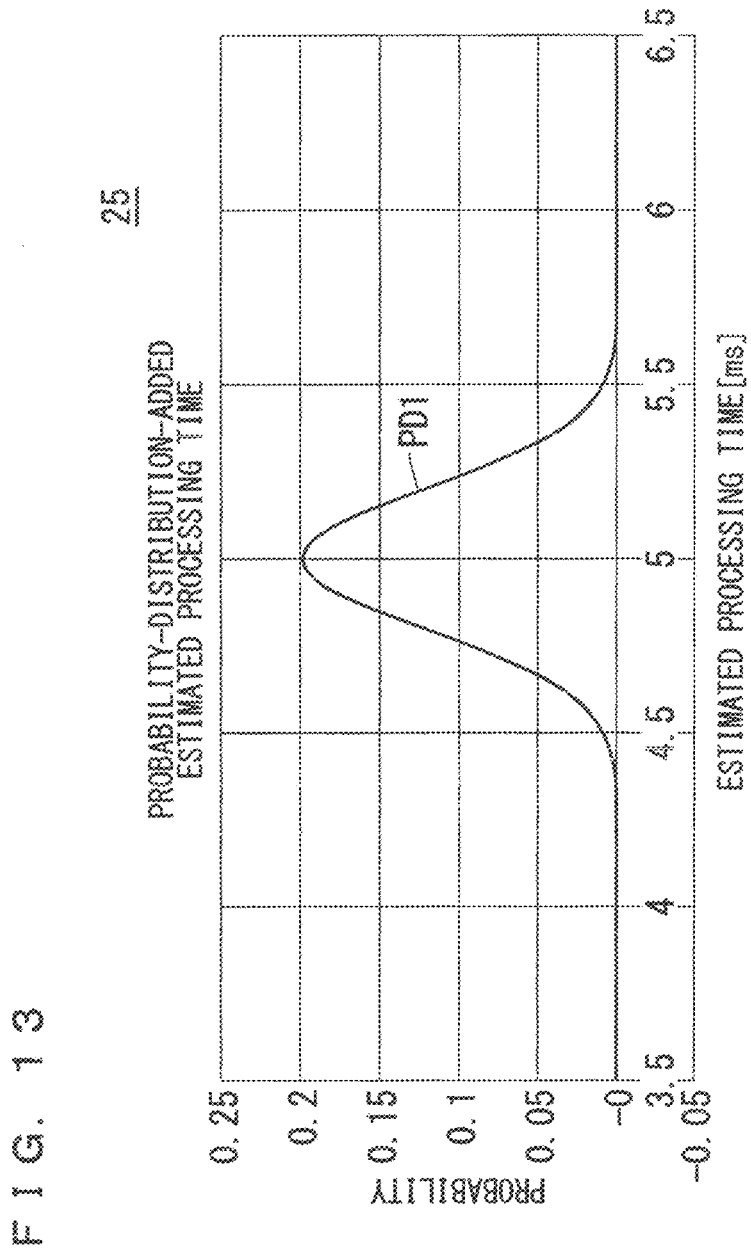
FIG. 13 is an illustration showing an example of an estimation result of a probability-distribution-added estimated processing time in graphical form.

FIGS. 13 and 14 are illustrations showing an example of an estimation result 25 of the probability-distribution-added estimated processing time. It is assumed herein that the estimation result 25 was a result of estimation of the icon 51 corresponding to the process A. FIG. 13 shows the probability-distribution-added estimated processing time in graphical form, in which a probability distribution PD1 is shown in corresponding relation to the estimated processing time (ms). FIG. 14 shows the probability-distribution-added estimated processing time in tabular form, in which the probability thereof is shown in corresponding relation to the estimated processing time (ms).

Figure 15:
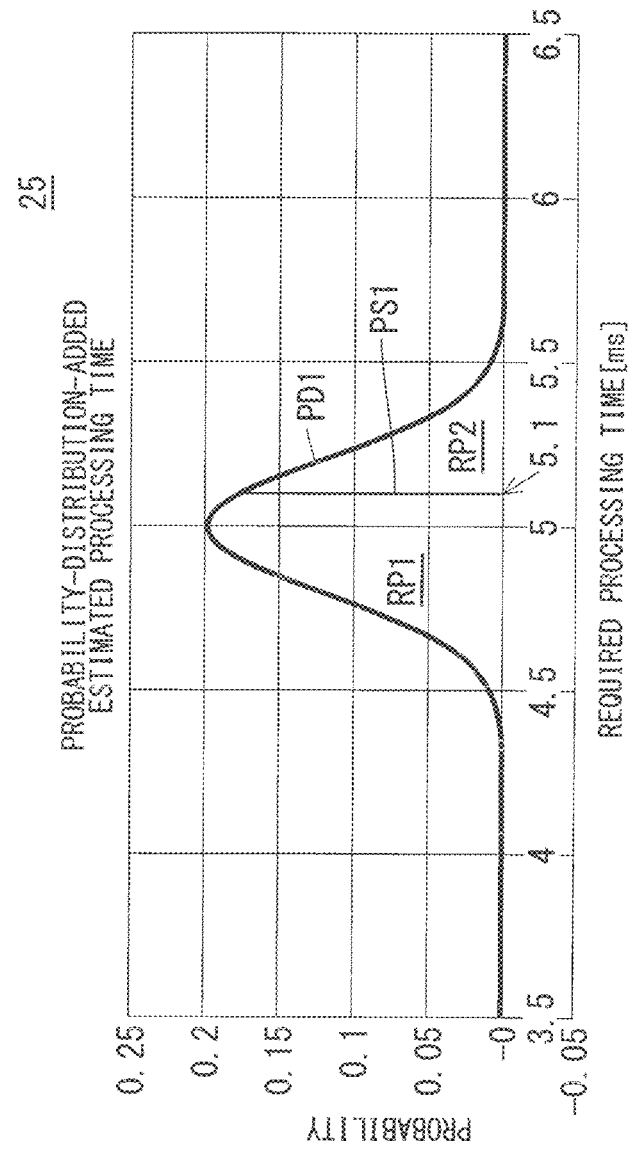
FIG. 15 is an illustration showing an example of analysis details of the probability-distribution-added estimated processing time shown in FIG. 13 in graphical form.

FIG. 15 is an illustration showing a relationship between the probability-distribution-added estimated processing time shown in FIG. 13 and the required processing time in graphical form. As shown in FIG. 15, there is shown a case in which the required processing time required for the process A of the icon 51 is 5.1 (ms), and a line extending vertically from 5.1 ms is a reference probability line PS1.

In this case, the ratio of the area of a region RP1 to the left of the reference probability line PS1 to the entire region with the probability distribution PD1 of not less than 0 indicates the probability of satisfying the required processing time, and the ratio of the area of a region RP2 to the right of the reference probability line PS1 to the entire region indicates the probability of not satisfying the required processing time. The areas of the regions RP1 and RP2 are determined by performing an integral operation on the probability distribution PD1.

As shown in FIGS. 13 to 15, the probability-distribution-added processing time estimation section 21X of the execution time estimation section 2X executes the processing time estimation process which obtains the probability-distribution-added estimated processing time for the process corresponding to each icon by calculating the estimation result 25 as shown in FIG. 15 for each icon.

Likewise, the probability-distribution-added communication time estimation section 22X of the execution time estimation section 2X executes the communication time estimation process which obtains the probability-distribution-added estimated communication time for communication corresponding to each communication path by calculating the estimation result similar to the estimation result 25 shown in FIGS. 13 to 15 for each communication path.

Figure 16:
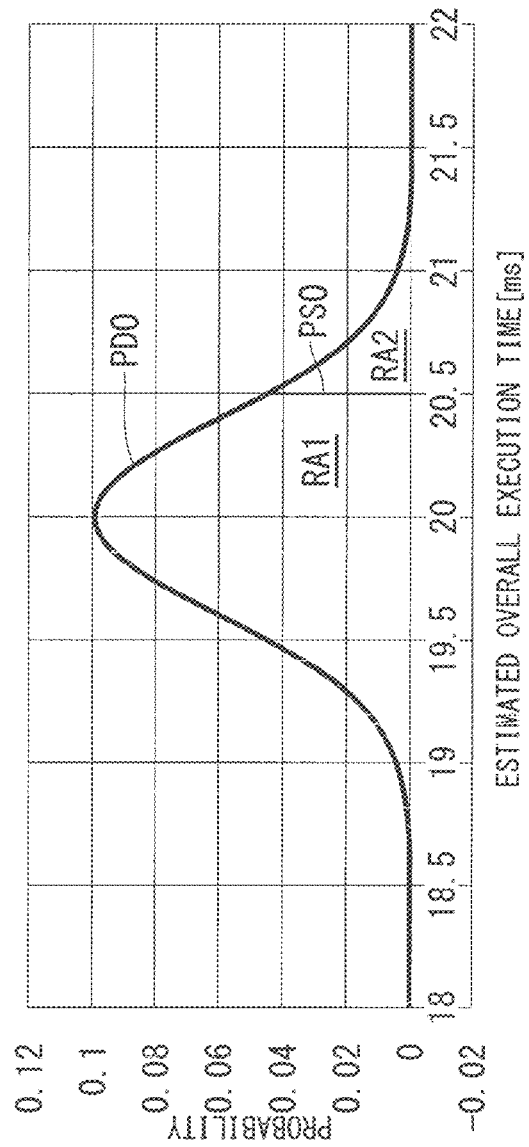
FIG. 16 is an illustration showing an example of an estimation result of a probability-distribution-added estimated overall execution time in graphical form.

FIG. 16 is an illustration showing an example of an estimation result 26 of a probability-distribution-added estimated overall execution time in graphical form. As shown in FIG. 16, a probability distribution PD0 is shown in corresponding relation to an estimated overall execution time (ms).

As shown in FIG. 16, there is shown a case in which the required overall execution time RT is 20.5 (ms), and a line extending vertically from 20.5 ms is a reference probability line PS0.

In this case, the ratio of the area of a region RA1 to the left of the reference probability line PS0 to the entire region with the probability distribution PD0 of not less than 0 indicates the probability of satisfying the required processing time, and the ratio of the area of a region RA2 to the right of the reference probability line PS0 to the entire region indicates the probability of not satisfying the required processing time. The areas of the regions RA1 and RA2 are determined by performing an integral operation on the probability distribution PD0.

As shown in FIG. 16, the execution time estimation section 2X executes the execution time estimation process which obtains the probability-distribution-added estimated overall execution time by calculating the estimation result 26 for the estimated overall execution time AT.

The estimation result 26 shown in FIG. 16 is obtained, for example, by first and second estimation methods to be described below. The first estimation method is a method in which the probability distribution of the estimated overall execution time AT is obtained by repeating a simulation. The aforementioned simulation is a simulation that executes a program including multiple icons and a necessary number of communication paths.

The second estimation method is a method in which calculation is performed using the multiple probability-distribution-added estimated processing times and the necessary number of probability-distribution-added estimated communication times. In other words, the second estimation method is a method derived by determining the simultaneous probability distribution of the probability-distributionadded estimated processing time for each icon and the probability-distribution-added estimated communication time for each communication path for the multiple icons and the necessary number of communication paths. Each probability-distribution-added estimated processing time includes the probability of satisfying the corresponding required processing time, and each probability-distribution-added estimated communication time includes the probability of satisfying the corresponding required communication time.

The program creation aid section 8 receives the program information D6 created by the program creation section 1, and the required-time-added program environment information D4t via the program creation section 1.

The program creation aid section 8 executes the program creation aid process by reference to the estimated-time-added program information D6t from the execution time estimation section 2X, based on the probability-distribution-added program information D6x and the required-time-added program environment information D4t.

The program creation aid process executed by the program creation aid section 8 is a probability-based assignment aid process which automatically assigns a CPU and an OS to each of the multiple icons so that the probability of satisfying the requited overall execution time RT is maximized.

During the execution of the probability-based assignment aid process, the program creation aid section 8 refers to the estimated-time-added program information D6t from the execution time estimation section 2X as appropriate to thereby check whether the probability of satisfying the required overall execution time RT has been maximized or not for an icon or a communication path for which the CPU and OS assignment is added or changed.

In the third embodiment, all of the multiple icons are the target of the process performed by the program creation aid section 8.

A conceivable example of the probability-based assignment aid process is an overall priority estimation method which uses the aforementioned first estimation method to repeatedly obtain the estimation result 26 of the estimated overall execution time from the execution time estimation section 2X while changing the CPU and OS assignment to the multiple icons.

Another conceivable method of the probability-based assignment aid process is an individual priority estimation method which sets the CPU and OS assignment to the multiple icons so that the probability of satisfying the required processing time corresponding to the multiple icons is the highest and the probability of satisfying the required communication time corresponding to the necessary number of communication paths is the highest.

In other words, the individual priority estimation method is an estimation method which uses the second estimation method and assumes the process of repeatedly obtaining the multiple probability-distribution-added estimated processing times and the necessary number of probability-distribution-added estimated communication times from the execution time estimation section 2X.

Thus, the individual priority estimation method derives the probability-distribution-added estimated overall execution time by obtaining the simultaneous probability distribution of the entire program from the aforementioned estimation result 25.

The hardware configuration of the third embodiment is also shown in FIG. 18, as in the first and second embodiments. However, the program creation aid section 8 and the execution time estimation section 2X are implemented by the computer 102 executing an application program.

In this manner, the program creation aid process executed by the program creation aid section 8 is the probability-based assignment aid process which automatically assigns a CPU and an OS to each of the multiple icons to be processed so that the probability of satisfying the required overall execution time RT is maximized.

FIG. 17 is a flow diagram showing a procedure for the program creation process using the program creation assistance device 73 of the third embodiment.

With reference to FIG. 17, a procedure for program development using foe program creation assistance device 73 of the third embodiment will be described.

The processes in Steps S41 to S44 and S47 are performed in the same manner as the processes in Steps S31 to S34 and S37 of the second embodiment shown in FIG. 11.

In Step S45 which is executed after Step S44, the program creation aid section 8 is placed into a start-up state. Specifically, information indicating the start of the operation of the program creation aid section 8 is provided from the input device 4.

Then, in Step S46, the aforementioned probability-based assignment aid process with all of the multiple icons as processing targets is executed by the program creation aid section 8.

The program creation assistance device 73 of the third embodiment is capable of developing a program with the highest probability of satisfying the required overall execution time RT desired by the operator as the user even when there is a process with a large variation range in execution time.

Although the processing target of the probability-based assignment aid process executed in Step S46 is all of the multiple icons in the third embodiment, the processing target may be limited as in the second embodiment.

In other words, a limit may be set so that an unspecified icon, an unsatisfactory icon, and an unsatisfactory communication path are the processing targets of the probability-based assignment aid process, as in the second embodiment.

A conceivable example or judgment details of the unsatisfactory icon is that the probability of not satisfying the required processing time is lower than a criterion, and a conceivable example of judgment details of the unsatisfactory communication path is that the probability of not satisfying the required communication time is lower than a criterion.

The program creation aid section 8 in the program creation assistance device 73 of the third embodiment executes the probability-based assignment aid process which automatically assigns a CPU and an OS to each of the multiple icons to be processed so that the probability of satisfying the required overall execution time RT is maximized.

The program creation assistance device 73 of the third embodiment is hence capable of automatically creating a program with the highest probability of satisfying the required overall execution time RT without placing a burden on the operator as the user.

The program creation assistance device 73 of the third embodiment also uses the probability-distribution-added program information D6x to show a program that is the best in the current situation to the user even when the probability of satisfying the required overall execution time RT is relatively low.

Others

In the aforementioned first to third embodiments, the communication detail description process by the communication detail description section 112 includes a communication method selection process which selects a communication method to be applied to each of a necessary number of communication paths as a selected communication method from among multiple types of communication methods.

The aforementioned communication method selection process is usually performed by the operator as the user using the input device 4. However, a modification in which the communication detail description section 112 automatically performs the communication method selection process is also conceivable.

To achieve the modification, the communication time estimation process of the communication time estimation section 22 (the probability-distribution-added communication time estimation section 22X) of the execution time estimation section 2 (2X) includes a communication-method-specific estimation process which obtains the estimated communication time of each of the multiple types of communication methods as a communication-method-specific estimation result for each of a necessary number of communication paths.

In the modification, the communication detail description section 112 hence causes the execution time estimation section 2 to execute the aforementioned communication-method-specific estimation process to obtain the communication-method-specific estimation result, thereby automatically selecting the communication method with the shortest estimated communication time as the selected communication method from among the multiple types of communication methods.

Thus, the communication detail description section 112 in the modification of the program creation assistance device of the present embodiment automatically executes the communication method selection process which selects the communication method with the shortest estimated communication time as the selected communication method from among the multiple types of communication methods, based on the communication-method-specific estimation result from the communication time estimation section 22.

This produces the effect of freeing the user from the labor of selecting the communication method to be applied to a necessary number of communication paths.

The embodiments may be freely combined or the embodiments may be changed and dispensed with, as appropriate, within the scope of the present disclosure.

The invention claimed is:

1. A program creation assistance device for a parallel real-time processing device, comprising:
an input device to provide program environment information including a configuration of a central processing unit (CPU) and an operating system (OS) for use by the parallel real-time processing device;
a program creation circuitry to create a program using the CPU and OS specified by the program environment information to output program information indicating details of the program; and
an execution time estimation circuitry to receive the program information and to execute an execution time estimation process which obtains an estimated program execution time for the program,
the program creation circuitry including
a processing configuration description circuitry to execute a processing configuration description process which brings multiple processes making up the program into correspondence with multiple icons, specifies a CPU and an OS for each of the multiple icons, and describes an execution order relationship between the multiple icons, and
a communication detail description circuitry to execute a communication detail description process which describes communication details of each of a necessary number of communication paths between the multiple icons,
the execution time estimation circuitry including
a processing time estimation circuitry to execute a processing time estimation process which obtains an estimated processing time by estimating a processing time of a corresponding process for each of the multiple icons, based on the specified CPU and OS, and
a communication time estimation circuitry to execute a communication time estimation process which obtains an estimated communication time by estimating a communication time for each of the necessary number of communication paths, based on the specified CPU and OS,
wherein the processing configuration description process and the communication detail description process are executed in response to a user operation using the input device, and an instruction for start of execution of the processing time estimation process and the communication time estimation process is provided by a user operation using the input device, and
wherein the execution time estimation process includes the processing time estimation process and the communication time estimation process, and the estimated program execution time includes the estimated processing time for each of the multiple icons and the estimated communication time for each of the necessary number of communication paths,
the program creation assistance device further comprising
a display to display estimated-time-added program information on a screen, the estimated-time-added program information being information in which the estimated processing time is brought into correspondence with each of the multiple icons and in which the estimated communication time is brought into correspondence with each of the necessary number of communication paths.

2. The program creation assistance device according to claim 1,
wherein the program creation circuitry further includes a processing detail creation circuitry to execute a processing detail creation process which creates processing details of each of the multiple icons, and
wherein the processing detail creation process is executed in response to a user operation using the input device.

3. The program creation assistance device according to claim 1,
wherein the program including the multiple icons for which the CPU and OS correspondence is completed and the necessary number of communication paths is specified as a fixed program, and the program information includes fixed program information indicating details of the fixed program,
the program creation assistance device further comprising
a program conversion circuitry to receive the fixed program information and to convert the fixed program into a dedicated program to be executed by the parallel real-time processing device,
the program conversion circuitry including a processing code generation circuitry to convert processing of the multiple icons in the fixed program into multiple processing codes for the parallel real-time processing device, and a communication code generation circuitry to convert the necessary number of communication paths in the fixed program into a necessary number of communication codes for the parallel real-time processing device, wherein the dedicated program includes the multiple processing codes and the necessary number of communication codes.

4. The program creation assistance device according to claim 1, wherein the program environment information includes required execution time information indicating a required overall execution time of the program, multiple required processing times corresponding to the multiple processes, and a necessary number of required communication times corresponding to the necessary number of communication paths, and wherein, an icon, if any, for which a CPU or an OS is not specified among the multiple icons is specified as at least one unspecified icon, the program creation assistance device further comprising a program creation aid circuitry to receive the program environment information and the program information and to execute a program creation aid process by reference to the estimated program execution time provided from the execution time estimation circuitry, wherein the program creation aid process includes a first assignment aid process which automatically assigns a CPU and an OS to each of the at least one unspecified icon so as to satisfy indication details of the required execution time information.

5. The program creation assistance device according to claim 4, wherein, if the estimated processing time for one or more of the multiple icons does not satisfy a corresponding required processing time among the multiple required processing times, one or more icons are specified as at least one unsatisfactory icon, wherein, if the estimated communication time for one or more of the necessary number of communication paths does not satisfy a corresponding required communication time among the necessary number of required communication times, one or more communication paths are specified as at least one unsatisfactory communication path, and wherein the program creation aid process includes a second assignment aid process which automatically assigns a CPU and an OS to each of the at least one unsatisfactory icon and the at least one unsatisfactory communication path so as to satisfy indication details of the required execution time information.

6. The program creation assistance device according to claim 1, wherein the processing time estimation circuitry includes a probability-distribution-added processing time estimation circuitry to execute the processing time estimation process which obtains a probability-distribution-added estimated processing time by estimating a processing time of a corresponding process for each of the multiple icons, based on the specified CPU and OS, wherein the communication time estimation circuitry includes a probability-distribution-added communication time estimation circuitry to execute the communication time estimation process which obtains a probability-distribution-added estimated communication time by estimating a communication time for each of the necessary number of communication paths, based on the specified CPU and OS, wherein the estimated processing time includes the probability-distribution-added estimated processing time, and the estimated communication time includes the probability-distribution-added estimated communication time, wherein the estimated program execution time includes the probability-distribution-added estimated processing time for each of the multiple icons and the probability-distribution-added estimated communication time for each of the necessary number of communication paths, and wherein the program environment information includes required execution time information indicating a required overall execution time of the program, multiple required processing times corresponding to the multiple processes, and a necessary number of required communication times corresponding to the necessary number of communication paths, the program creation assistance device further comprising a program creation aid circuitry to receive the program environment information and the program information and to execute a program creation aid process by reference to the estimated program execution time provided from the execution time estimation circuitry, wherein the program creation aid process includes a probability-based assignment aid process which automatically assigns a CPU and an OS to at least part of the multiple icons to be processed so that the probability of satisfying the required overall execution time is maximized.

7. The program creation assistance device according to claim 1, wherein the communication detail description process executed by the communication detail description circuitry includes a communication method selection process which selects a communication method to be applied to each of the necessary number of communication paths as a selected communication method from among multiple types of communication methods, wherein the communication time estimation process executed by the communication time estimation circuitry includes a process which obtains the estimated communication time of each of the multiple types of communication methods as a communication-method-specific estimation result for each of the necessary number of communication paths, and wherein the communication method selection process executed by the communication detail description circuitry is a process which selects a communication method with the shortest estimated communication time as the selected communication method from among the multiple types of communication methods, based on the communication-method-specific estimation result.

* * * * *